United States Patent [19]

Sagers et al.

[11] Patent Number: 5,442,805
[45] Date of Patent: Aug. 15, 1995

[54] LOCATION-BASED ADAPTIVE RADIO CONTROL

[75] Inventors: Richard C. Sagers, Fort Worth, Tex.; William D. Werner, Coral Springs, Fla.; Scott M. Hall, Fort Worth; David W. Heinzelmann, Bedford, both of Tex.

[73] Assignee: Motorola, Inc., Schaumburg, Ill.

[21] Appl. No.: 892,303

[22] Filed: Jun. 2, 1992

Related U.S. Application Data

[63] Continuation-in-part of Ser. No. 667,236, Mar. 8, 1991, abandoned, which is a continuation-in-part of Ser. No. 253,529, Oct. 5, 1988, abandoned.

[51] Int. Cl.[6] .................... H04B 1/40; H04B 7/26; H04Q 7/32
[52] U.S. Cl. .................... 455/33.1; 455/54.1; 455/88; 455/89; 342/457
[58] Field of Search .................... 455/62, 67.1, 54.1, 455/33.1, 33.2, 35.1, 212, 218, 221, 200.1, 127, 88, 89, 166.1, 183.2, 184.1, 185.1, 186.1, 345, 69, 70; 342/419, 457

[56] References Cited

U.S. PATENT DOCUMENTS

| | | | |
|---|---|---|---|
| 4,218,773 | 8/1980 | Imamura | 455/166.1 |
| 4,430,753 | 2/1984 | Shiratani | 455/166.1 |
| 4,445,118 | 4/1984 | Taylor et al. | 342/457 |
| 4,476,582 | 10/1984 | Strauss et al. | 455/345 |
| 4,550,443 | 10/1985 | Freeburg | 455/33.1 |
| 4,560,978 | 12/1985 | Lemelson . | |
| 4,593,409 | 6/1986 | Miller | 455/127 |
| 4,635,296 | 1/1987 | Dinsmore | 455/127 |
| 4,651,157 | 3/1987 | Gray et al. | 342/457 |
| 4,817,192 | 3/1989 | Phillips et al. | 455/200.1 |
| 5,214,789 | 5/1993 | George | 455/33.2 |
| 5,235,633 | 8/1993 | Dennison et al. | 455/33.2 |

*Primary Examiner*—Chi H. Pham
*Assistant Examiner*—Mark D. Wisler
*Attorney, Agent, or Firm*—Michael J. Buchenhorner; Daniel K. Nichols; M. Mansour Ghomeshi

[57] ABSTRACT

A method (200) and apparatus (100) is provided for a radio having adjustable operating parameters to adjust at least one such adjustable operating parameter based on the current location of the radio. Operating parameters which may be so adjusted include, but are not limited to, the following: transmitting power, operating channel, operating band, modulation type, modulation index, frequency deviation, squelch setting, channel spacing, control channel (for trunked communications), noise blanker characteristic, and receive bandwidth. In another embodiment, transmissions by the radio can be inhibited as a function of the location when it is determined that the location is within a hazard area.

5 Claims, 2 Drawing Sheets

100

200

LOCATION-BASED ADAPTIVE RADIO CONTROL

This application is a continuation-in-part of U.S. application Ser. No. 07/667,236, filed Mar. 8, 1991, now abandoned which is continuation-in-part of U.S. application Ser. No. 07/253,529, filed Oct. 5, 1988, now abandoned.

BACKGROUND OF THE INVENTION

This invention pertains to radios.

Two-way radios have a number of operating parameters including, but not limited to, transmitting power, operating frequencies (channel), operating band modulation type, modulation index, frequency deviation, squelch setting, channel spacing, control channel (for trunked communications), noise blanker characteristic, and receive bandwidth. Of these parameters, some are fixed, while others may be, to some degree, variable. One example of a parameter which is usually, but not always, fixed is the modulation type, such as FM or AM. One example of a parameter which is usually, but not always, favorable is the operating frequency or frequencies (channel).

At a given time, it may be desirable to adjust the operating parameters in response to the current operating environment to obtain optimum performance. For example, it may be desirable to minimize interference to other users.

A significant factor in determining the current optimum operating parameters is the geographic location of the radio. As an example, a particular radio operating in a densely-populated area, such as downtown Los Angeles, Calif. must contend with, among other factors, a relatively large number of other radios using the same frequency spectrum. As a result, the available frequencies (channels) may be limited. Also, the radio must limit its transmitting power to avoid interfering with neighboring users. On the other hand, if this identical radio were located in the middle of a sparsely-populated area, such as Death Valley, Calif., it would contend with few (if any) other radios using the same frequency spectrum. As a result, more channels are available and the transmitting power may be increased to achieve greater range without interfering with neighboring users.

For radios which are fixed in location, that is, non-mobile, usually there are few parameters, if any, which need to be varied during day-to-day operation. This is because the operating environment is relatively constant for the radio which is due, to a large extent, to the fact that the location of the radio is fixed.

For radios whose location is not fixed (that is, mobile), on the other hand, it is desirable for operating parameters to be adjusted whenever a change in the location of the radio causes the operating environment to change. For example, using the above example, if a mobile radio initially selects an operating frequency band and transmit power while it is located in downtown Los Angeles, the radio may need to periodically adjust (change) these frequency band and power settings as its location constantly changes during the course of its journey from the downtown area to a final destination of Death Valley, Moreover, it also may be advantageous to change other operating parameters during the course of such a journey.

Another situation where a mobile radio might need to adjust operating parameters based on its location arises in trunked radio systems. In such systems, many subscriber units share a fixed (and typically smaller) number of communication channels. In such systems, a common control station uses a control channel to allocate the shared channels amongst the subscriber units. When a subscriber wishes to place a call, it first tunes to the control channel and transmits a channel request message to the control station. Upon receipt of this message (and assuming an idle channel is available) the controls station reserves, or assigns, an idle channel for the call. The control station then transmits the channel assignment information to the requesting subscriber via the control channel. Upon receipt of this channel assignment message, the requesting subscriber unit tunes to the assigned channel and proceeds to place its call.

In general, then, it is desirable for a mobile radio to have the ability to change operating parameters based on its current location. Given this fact, the question arises of how to effect the desired changes in the operating parameters. While it is obvious the human operator could manually adjust the operating parameters to obtain optimum performance, this could also prove to be risky. This is because, due to human error, the operator may be mistaken as to either the present location of the radio, or the current optimum operating parameters for the present location of the radio, or both.

SUMMARY OF THE INVENTION

According to the invention, a method is provided, and an apparatus described, whereby one or more operating parameters of a mobile radio may be varied automatically, and without human intervention, based on the location of the radio. In another aspect of the invention, the radio includes a device for inhibiting transmissions when it is determined that the radio is within a hazardous area.

DETAILED DESCRIPTION OF THE INVENTION

The invention may be used with any location determining device or system (101), such as LORAN, satellite global positioning systems, or dead reckoning, and with any mobile radio having adjustable operating parameters. Such location determining systems are well understood and need not be described here in any further detail. (in the context of this invention, "mobile" refers to a non-fixed location radio, and includes both vehicle mounted and personally carried radios.)

Figure 1:
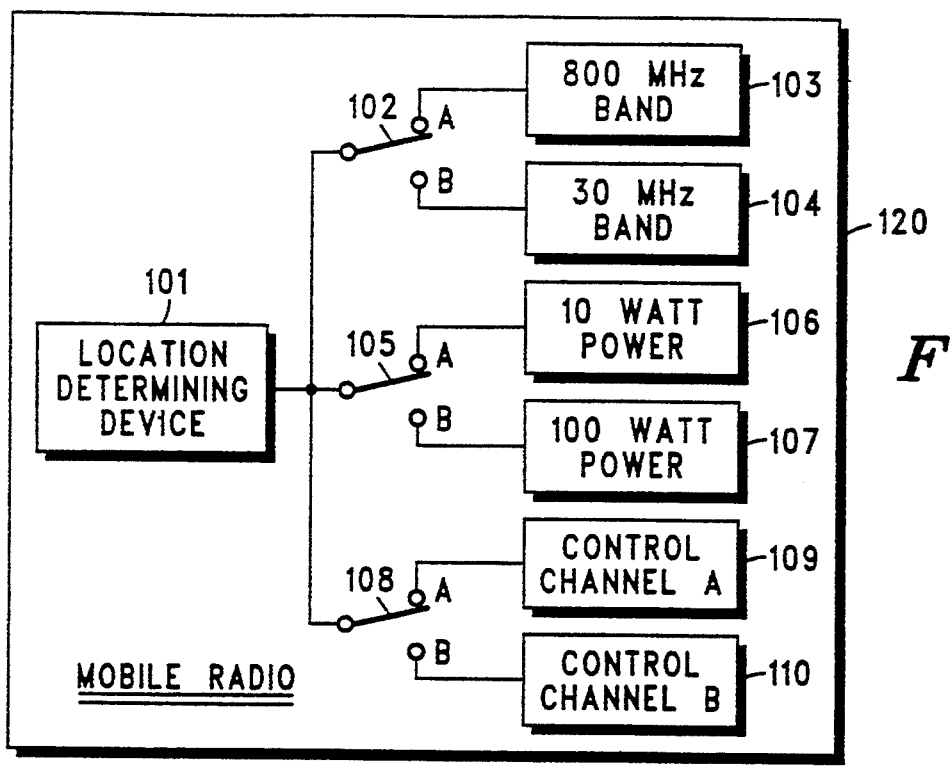
FIG. 1 depicts the location-based adaptive radio control arrangement.

Referring to FIG. 1, switch 1 (102) is arranged to select the operating frequency band of the radio. When switch 1, is in position designated "A", the radio operates on the 800 MHz band (103). When switch 1 is in the position designated "B", the radio operates on the 30 MHz band (104).

Switch 2 (105) is arranged to select the output power level of the transmitter. When switch 2 is in the position designated "A", the output power is 10 Watts (106). When switch 2 is in the position designated "B", the output power is 100 Watts (107).

Switch 3 (108) is arranged to select the control channel of the radio. When switch 3 is in the position designated "A", the control channel selected is channel A (109). When switch 3 is in position designed "B", the control channel selected is channel B (110).

The mobile radio 120 is equipped with a location determining device (101) which, in turn, is arranged to control the position of switch 1 (102), switch 2 (105), and switch 3 (108). In this embodiment, the location determining device (101) is capable of determining whether the radio is located in location A (the urban area) or location B (the rural area).

When the location determining device (101) determines the radio is located in location A, it causes switch 1 (102) to reside in position "A", thereby causing the radio to operate on the 800 MHz band. Also when the location determining device (101) determines the radio is located in location A, it causes switch 2 (105) to reside in position "A", thereby causing the radio to transmit at 10 Watts power output. Finally, when the location determining device (101) determines the radio is located in location A, it causes switch 2 (105) to reside in position "A", thereby causing the radio to transmit at 10 Watts power output. Finally, when the location determining device (101) determines the radio is located in location A, it causes switch 3 (108) to also reside in position "A", thereby causing the radio to use channel A as a control channel. When the location determining device (101) determines the radio is located in location B, it causes switch 1 (102) to reside in position "B", thereby causing the radio to operate on the 30 MHz band. Also when the location determining device (101) determines the radio is located in location B, it causes switch 2 (105) to reside in position "B", thereby causing the radio to transmit at 100 Watts power output. Finally, when the location determining device (101) determines the radio is located in location B, it causes switch 3 (108) to reside in position "B", thereby causing the radio to use channel B as a control channel.

Figure 2:
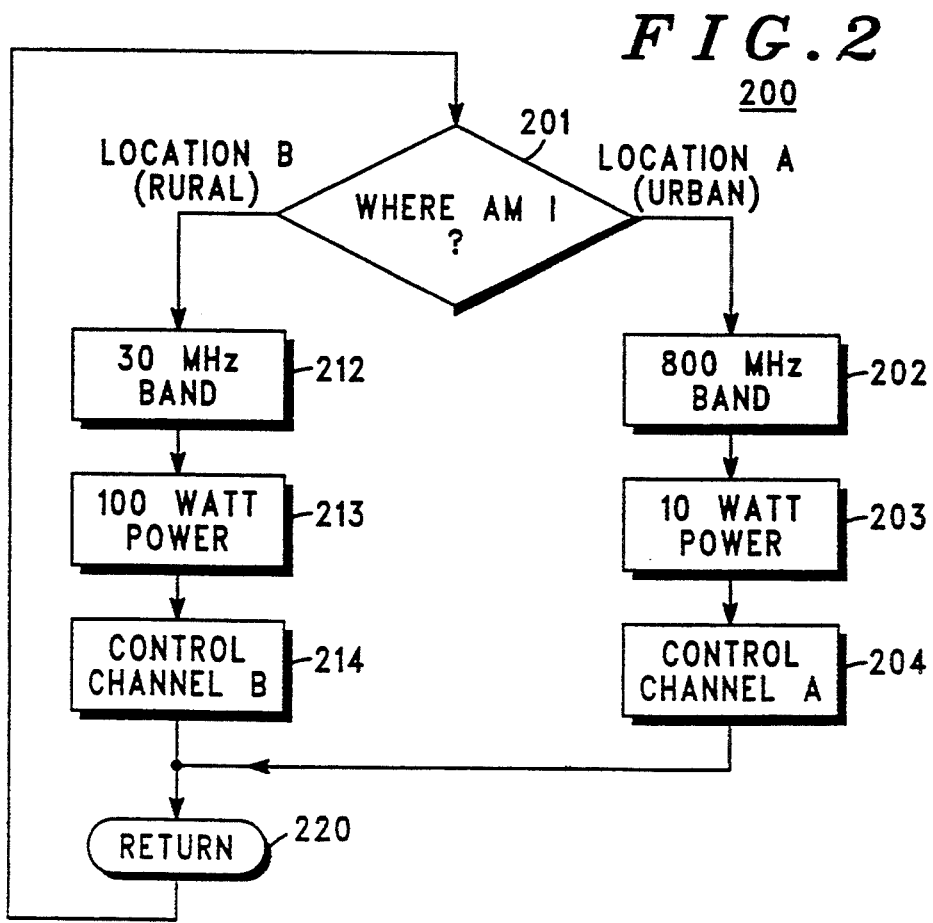
FIG. 2 depicts a flow diagram illustrating the steps of the invention.

FIG. 2 shows the flow diagram (200) of the steps of the invention. The process starts with the radio determining its location (201). If the radio determines it is located in a first predetermined location, such as location A (the urban area), the radio operates on the 800 MHz band (202), adjust the transmitter to 10 Watts of output power (203), and uses channel A as a control channel (204). The radio then returns (220) to its initial determining step (201), and makes a new determination of its location.

In this embodiment, if the radio determines it is located in location B (the rural area), the radio operates on the 30 MHz band (212), adjusts its transmitter to 100 Watts of output power (213), and uses channel B as a control channel (214). The radio then returns (220) to its initial determining step (201), and makes a new determination of its location.

Figure 3:
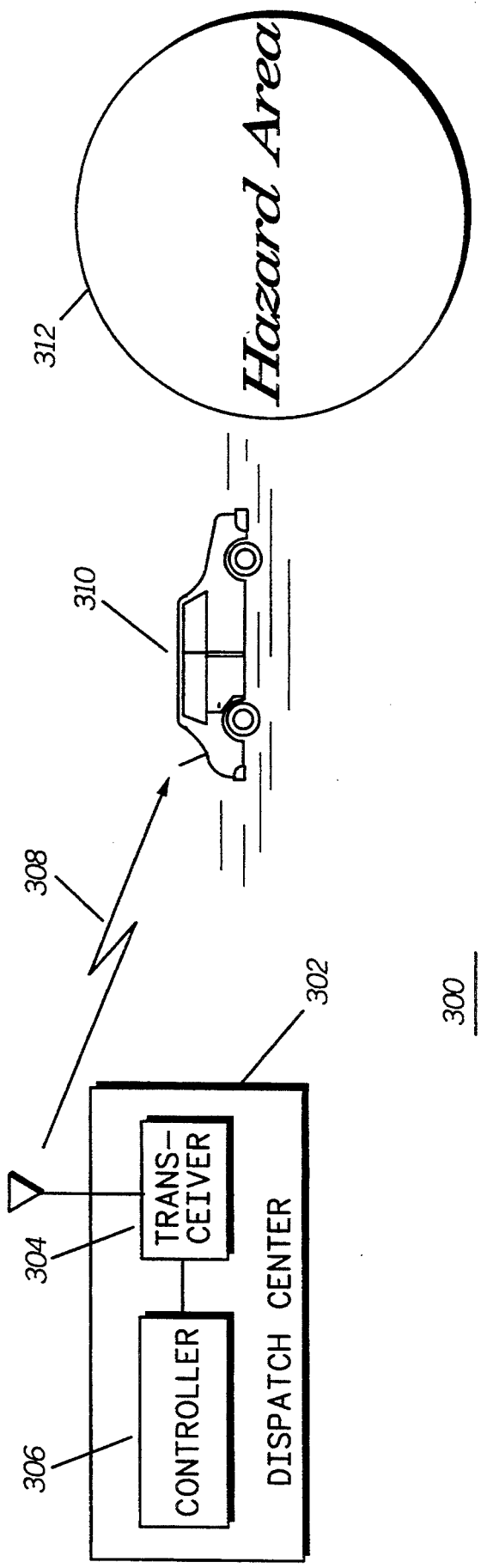
FIG. 3 shows a communication system in accordance with an embodiment of the invention.

Referring to FIG. 3 there is shown a communication system 300 in accordance with another embodiment of the invention. The communication system 300 comprises a dispatch center 302 having a transceiver 304 for dispatching messages to various mobile radios in the system, and a controller (including a computer) 306. In this embodiment of the invention, a mobile radio (represented by a vehicle 310) using position determining means can be used to prevent the radio 310 from transmitting in an area 312 where the emission of radio waves could present a hazard to the user of the radio 310. An example of such a hazard is an area where unstable explosives are present. The transmissions can be prevented by prohibiting operator-initiated voice or automatic push-to-talk transmissions when the location determining means determines that the radio 310 is located in a hazardous area.

The transmissions of the radio 310 can be inhibited by activating a conventional transmit inhibit device in the radio 310 in response to a transmit inhibit command broadcasted by the dispatch center 302.

The mobile radio 310 could be programmed with a list of known hazardous areas where transmission is automatically inhibited. The prevention of transmissions may also be implemented by programming the radio 310 and the dispatcher controller 306 (the fixed end) to inhibit transmissions. The dispatcher issues an instruction to the controller 306. The instruction takes the form of a command, address, and distance. The command calling for inhibiting transmission is transmitted (308) to the radio 310. The address is the address of the hazardous area. The distance is the radius within which the radio 310 will not transmit. The form of the data sent from a fixed computer at the controller 306 to all mobile or portable radios is: COMMAND: LATITUDE/LONGITUDE: DISTANCE. A cancel command is also included.

Once the radio 310 enters the hazard area 312 indicated by the dispatcher, the radio 31 0 determines if it has entered the circle of prohibited transmissions, and inhibits its transmissions until it is outside area 312. When it leaves the circle the radio updates its location.

When the invention is used to inhibit the voice transmission of the radio operator, an indicator light can be used to inform the user that transmissions are being inhibited. In addition, a manual override switch can be provided in the radio to allow the user to transmit at his discretion.

What is claimed is:

1. A mobile radio comprising:
   programming means for storing at least one predetermined hazardous area location;
   locating means for determining the location of the mobile radio; and
   transmit inhibit means for inhibiting all transmissions by the mobile radio when the mobile radio is within the at least one predetermined hazardous area location.

2. A mobile radio as defined in claim 1, in which said locating means comprises satellite global positioning system locating means.

3. A mobile radio as defined in claim 1, in which said locating means comprises LORAN locating means.

4. A mobile radio as defined in claim 1, in which said locating means comprises dead reckoning locating means.

5. A communication system, comprising:
   a dispatch center;
   a mobile radio unit comprising location determining means for determining the location of the radio;
   said dispatch center comprises means for sending the mobile radio unit transmit inhibit commands indicating an address and a radius for defining a hazardous area;
   said mobile radio unit comprising;
   programming means for storing the transmit inhibit commands; and
   transmit inhibit means for inhibiting all transmissions by the mobile radio when the location of the radio determined by the location determining means is within the hazardous area.

* * * * *